(12) United States Patent
Katou et al.

(10) Patent No.: US 6,983,650 B2
(45) Date of Patent: Jan. 10, 2006

(54) SEMICONDUCTOR SENSOR AND TRANSMITTER FOR USE IN TIRE CONDITION MONITORING APPARATUS

(75) Inventors: Michiya Katou, Ogaki (JP); Youichi Okubo, Ogaki (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 73 days.

(21) Appl. No.: 10/694,341

(22) Filed: Oct. 27, 2003

(65) Prior Publication Data

US 2004/0085078 A1    May 6, 2004

(30) Foreign Application Priority Data

Oct. 12, 2002    (JP)    .............................. 2002-358174

(51) Int. Cl.
*G01M 17/02*    (2006.01)
(52) U.S. Cl. .............................. 73/146; 73/715; 73/753
(58) Field of Classification Search .......... 73/700–756, 73/146–146.8; 340/444–447
See application file for complete search history.

(56) References Cited

U.S. PATENT DOCUMENTS

| | | | |
|---|---|---|---|
| 3,304,534 A | | 2/1967 | Sykes |
| 4,625,560 A | | 12/1986 | Sanders |
| 5,095,349 A | * | 3/1992 | Fujii et al. ................... 257/108 |
| 5,320,705 A | * | 6/1994 | Fujii et al. .................... 438/51 |
| 5,531,092 A | * | 7/1996 | Okada ........................ 73/1.13 |
| 6,633,229 B1 | * | 10/2003 | Normann et al. ........... 340/447 |

FOREIGN PATENT DOCUMENTS

| | | |
|---|---|---|
| EP | 0 333 091 A2 | 9/1989 |
| JP | 8-160072 A | 6/1996 |
| JP | 9-18017 A | 1/1997 |
| JP | 10132572 A * | 5/1998 |

* cited by examiner

*Primary Examiner*—Max Noori
*Assistant Examiner*—Jermaine Jenkins
(74) *Attorney, Agent, or Firm*—Crompton, Seager & Tufte, LLC

(57) ABSTRACT

A compact and light semiconductor sensor for detecting pressure and acceleration. A pressure sensor is formed on a first surface of an intermediate plate. An acceleration sensor is formed on a second surface of the intermediate plate. A first plate having a diaphragm is bonded to the intermediate plate to define a hermetic chamber of the pressure sensor. A second plate is bonded to the second surface of the intermediate plate. A spring support supports the mass in a manner relatively movable with respect to the second plate.

17 Claims, 5 Drawing Sheets

SEMICONDUCTOR SENSOR AND TRANSMITTER FOR USE IN TIRE CONDITION MONITORING APPARATUS

BACKGROUND OF THE INVENTION

The present invention relates to an apparatus for monitoring the air pressure of a tire for an automobile, and more particularly, to a semiconductor sensor for use in such a monitoring apparatus.

A wireless communication type tire monitoring apparatus for monitoring the condition of a plurality of vehicle tires from a passenger compartment is known in the prior art. The tire monitoring apparatus of the prior art includes a transmitter provided for each vehicle tire to transmit a signal indicating the air pressure of the tire. The tire monitoring apparatus also includes a display for informing the automobile driver of the air pressure of each tire. The driver monitors from the passenger compartment whether the air pressure in each tire is appropriate.

Each transmitter includes an acceleration sensor for detecting whether the automobile is moving. The transmitter detects the air pressure and transmits the detection result only when the automobile is moving. This reduces unnecessary consumption of a primary battery that functions to supply power to the transmitter and prolongs the life of the primary battery.

The transmitter has a circuit board. A microcomputer and electronic components, which are used in a pressure sensor, an acceleration sensor, a primary sensor, a transmitting circuit, and an oscillation circuit, are connected to the circuit board. These devices are integrated to manufacture a relatively compact transmitter. Japanese Laid-Open Patent Publication No. 9-18017 describes a pressure sensor and an acceleration sensor of the prior art. Among the components of the transmitter, the pressure sensor and the acceleration sensor are relatively large. It was difficult to decrease the size of these sensors in the prior art.

SUMMARY OF THE INVENTION

It is an object of the present invention to provide a compact and light semiconductor sensor.

To achieve the above object, the present invention provides a semiconductor sensor including an intermediate plate having a first surface and a second surface. A first electrode is arranged on the first surface. A second electrode is arranged on the second surface. A first plate has a cavity for forming a diaphragm and is bonded to the first surface. The first plate, the intermediate plate, and the cavity define a hermetic chamber. A third electrode is arranged in the cavity facing towards the first electrode. The third electrode and the first electrode are arranged in the hermetic chamber. A second plate is bonded to the second surface and has a mass. The second plate includes an elastic support for elastically supporting the mass and a fourth electrode arranged on the mass facing towards the second electrode.

Another aspect of the present invention is a transmitter for use in an apparatus for monitoring a condition of a tire on a vehicle. The transmitter includes a semiconductor sensor for detecting acceleration and air pressure of the tire. The semiconductor sensor includes an intermediate plate having a first surface and a second surface. A first electrode is arranged on the first surface. A second electrode is arranged on the second surface. A first plate has a cavity for forming a diaphragm and is bonded to the first surface. The first plate, the intermediate plate, and the cavity define a hermetic chamber. A third electrode is arranged in the cavity facing towards the first electrode. The third electrode and the first electrode are arranged in the hermetic chamber. A second plate is bonded to the second surface and has a mass. The second plate includes an elastic support for elastically supporting the mass and a fourth electrode arranged on the mass facing towards the second electrode. A controller is connected to the semiconductor sensor to determine whether the vehicle is moving based on the detected acceleration. The controller transmits information of the detected tire air pressure when the vehicle is moving.

A further aspect of the present invention is a semiconductor sensor including an intermediate plate having a first surface and a second surface. A pressure sensing portion is defined on the first surface. The pressure sensing portion includes a first electrode arranged on the first surface. A first plate is bonded to the first surface. The first plate has a cavity for forming a diaphragm. The first plate, the intermediate plate, and the cavity define a hermetic chamber. A third electrode is arranged in the cavity facing towards the first electrode. The third electrode and the first electrode are arranged in the hermetic chamber. An acceleration sensing portion is defined on the second surface. The acceleration sensing portion includes a second electrode arranged on the second surface. A second plate is bonded to the second surface and has a mass. An elastic support elastically connects the second plate and the mass. A fourth electrode is arranged on the mass facing towards the second electrode.

A further aspect of the present invention is a transmitter for use in an apparatus for monitoring the condition of a tire of a vehicle. The transmitter has a semiconductor sensor including a pressure sensing portion for detecting air pressure of the tire and an acceleration sensing portion for detecting acceleration. The pressure sensing portion and the acceleration sensing portion formed integrally with each other. A controller connected to the semiconductor sensor for determining whether or not the vehicle is moving from the detected acceleration. The controller transmits information of the detected tire air pressure when the vehicle is moving.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A tire condition monitoring apparatus 1 according to a preferred embodiment of the present invention will now be described.

Figure 1:
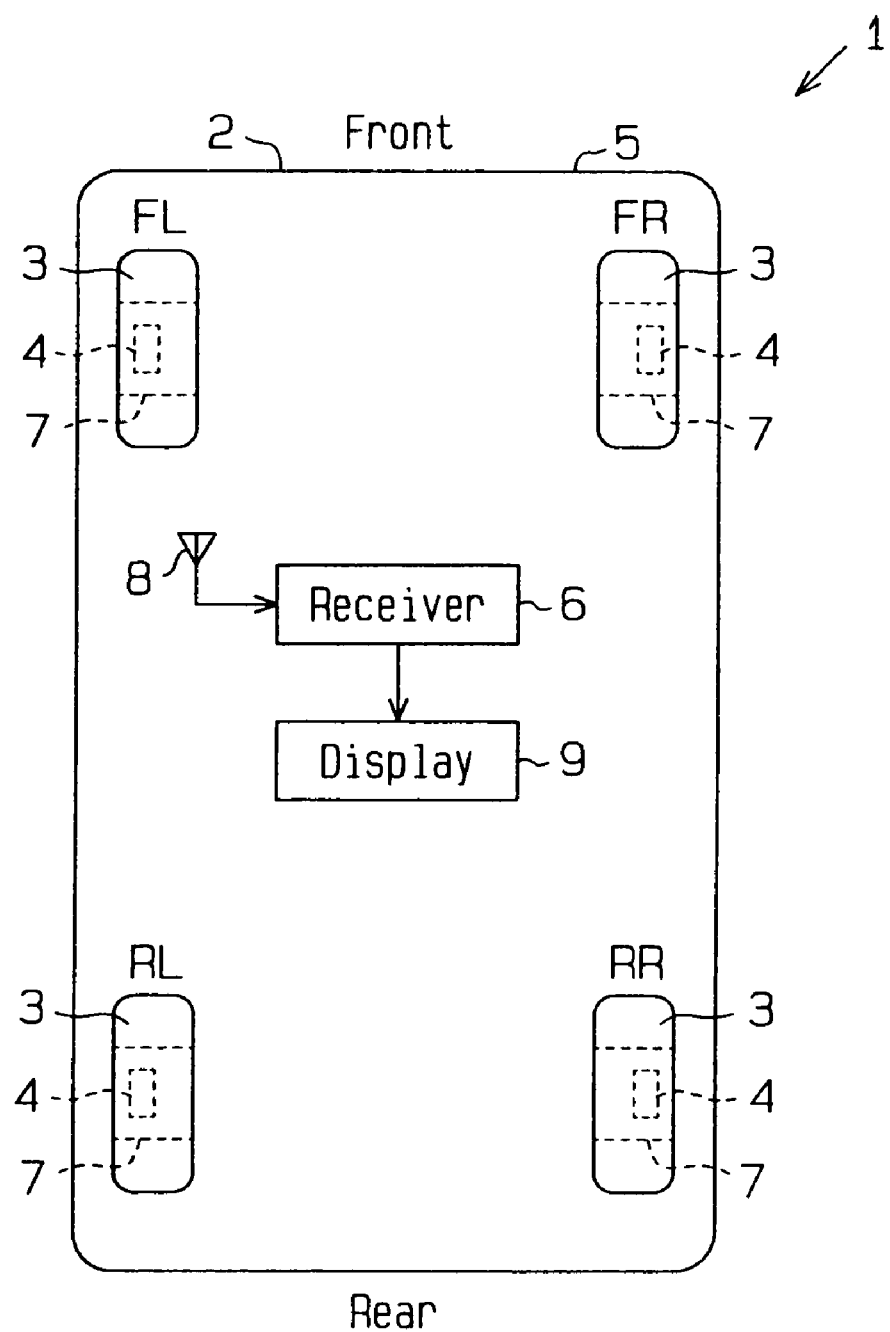
FIG. 1 is a schematic diagram illustrating a tire condition monitoring apparatus according to a preferred embodiment of the present invention.

As shown in FIG. 1, the tire condition monitoring apparatus 1 includes four transmitters 4, each arranged on one of four tires 3 of a vehicle 2. The four tires 3 are located on the front left side (FL), the front right side (FR), the rear left side (RL), and the rear right side (RR) of the vehicle 10. A receiver 6 is arranged in a body 5 of the vehicle 2.

Each transmitter 4 is fixed to the inside of the associated tire 3, such as to a wheel 7 of the tire 3. Each transmitter 4 measures the condition, or the air pressure and temperature, of the associated tire 3 and transmits the measured result (information of the air pressure and temperature) in a wireless manner.

The receiver 6 is arranged at a predetermined location of the body 5 and operated by, for example, the battery (not shown) of the vehicle 2. The receiver 6 is connected to a receiving antenna 8. The receiving antenna 8 receives the measured result of each transmitter 4 through the receiving antenna 8. In this manner, the air pressure and the temperature of each tire 3 is provided by the transmitter 4 to the receiver 6.

The receiver 6 is connected to a display 9. The display 9 is arranged in the visual range of a driver, such as in the passenger compartment. When the air pressure of a tire 3 is abnormal, a warning indication may be shown on the display 9. It is preferred that the receiver 6 be actuated in accordance with the actuation of an ignition switch (not shown) of the vehicle 2.

The transmitter 4 will now be discussed with reference to FIGS. 2 and 3.

Each transmitter 4 includes a casing 11 and a valve stem 12, which is formed integrally with the casing 11. Air is charged into the associated tire 3 through the valve stem 12. The casing 11 accommodates a signal processor 13 and a battery 14. The casing 11 has a cover (not shown), which covers the signal processor 13 and the battery 14. A hole (not shown) extends through the casing 11.

The signal processor 13 includes a rectangular circuit board 15. An electronic semiconductor sensor 16 and a processing circuit 17 are connected to the circuit board 15. The circuit board 15 is fixed to projections 18 and 19, which are formed integrally with the casing 11. The circuit board 15 is connected to the battery 14, which supplies the processing circuit 17 with power.

Figure 3:
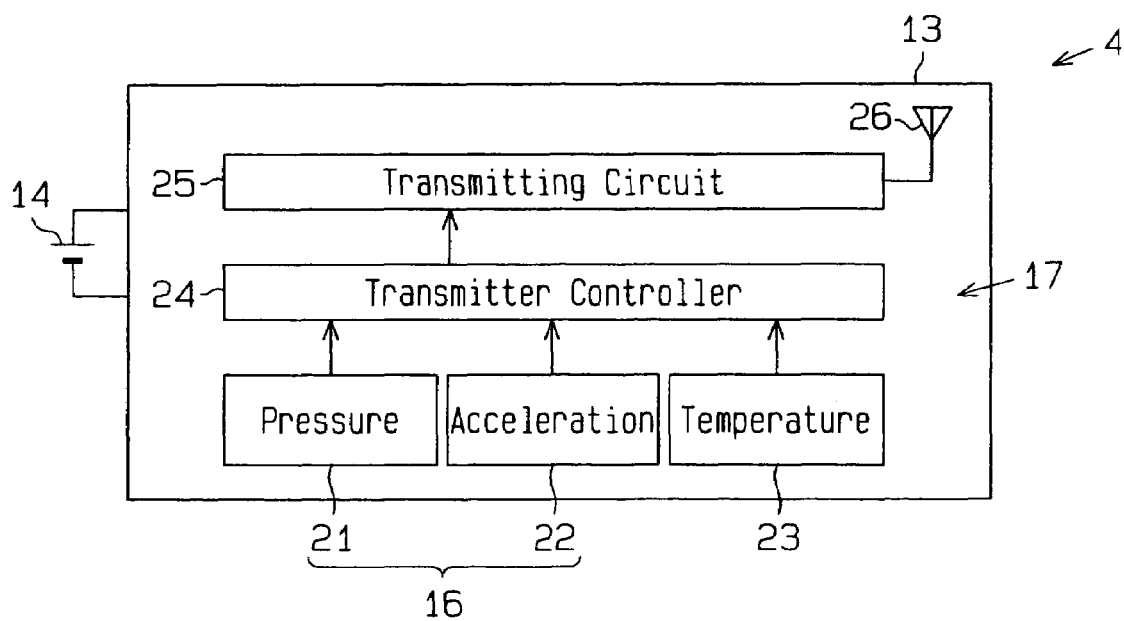
FIG. 3 is a block diagram illustrating the transmitter.

As shown in FIG. 3, the signal processor 13 includes the semiconductor sensor 16 and the processing circuit 17. The semiconductor sensor 16 includes a pressure sensing portion 21 and an acceleration sensing portion 22, which are formed integrally with each other. The processing circuit 17 includes a temperature sensor 23, a transmitter controller 24, which is a microcomputer or the like, and a transmitting circuit 25. The transmitter controller 24 includes, for example, a central processing unit (CPU), a read only memory (ROM), and a random access memory (RAM). The transmitter controller 24 registers an ID code in an internal memory, such as in the ROM. The receiver 6 refers to the ID code to identify each of the four transmitters 4.

The pressure sensing portion 21 detects the air pressure of the tire 3 and provides the transmitter controller 24 with a signal corresponding to the detected air pressure. The acceleration sensing portion 22 detects the acceleration of the semiconductor sensor 16 when the vehicle 2 moves and provides the transmitter controller 24 with a signal corresponding to the detected acceleration. The temperature sensor 23 detects the temperature of the tire 3 and provides the transmitter controller 24 with a signal corresponding to the detected temperature.

The transmitter controller 24 generates air pressure information based on the signal from the pressure sensing portion 21 and temperature information based on the signal from the temperature sensor 23. Then, the transmitter controller 24 provides the transmitting circuit 25 with the air pressure and temperature information together with its registered ID code.

The transmitting circuit 25 encodes and modulates the air pressure information and the temperature information received from the transmitter controller 24 to generate modulated data and transmits the modulated data via the transmitting antenna 26.

The transmitter controller 24 determines whether or not the vehicle 2 is moving based on the signal from the acceleration sensing portion 22. The transmitter controller 24 generates modulated data only when the vehicle 2 is moving and has the transmitting circuit 25 transmit the modulated data. When the vehicle 2 is not moving, the transmitter controller 24 stops functioning. This reduces consumption of the battery 14, prolongs the time during which the signal processor 13 is operable, and decreases the replacement frequency of the battery 14.

The configuration of the semiconductor sensor 16 will now be discussed.

Figure 4:
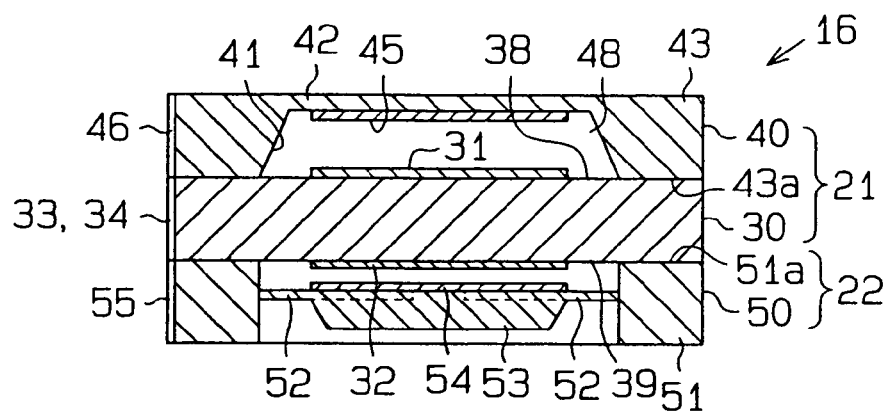
FIG. 4 is a cross-sectional view of a semiconductor sensor.
Figure 6:
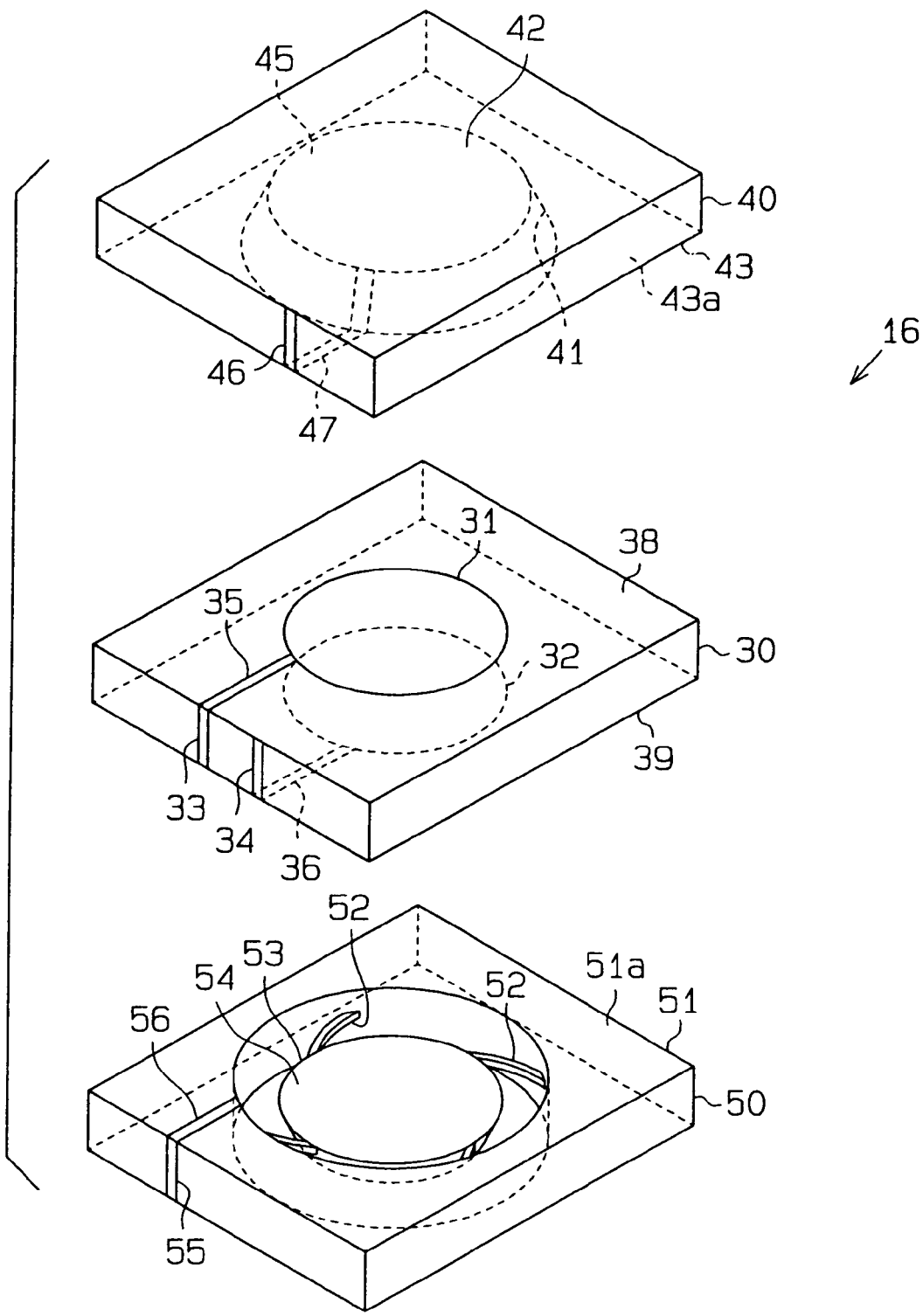
FIG. 6 is an exploded perspective view of the semiconductor sensor.

As shown in FIGS. 4 and 6, the semiconductor sensor 16 is formed by bonding three plates 30, 40, and 50. The first plate 40 is bonded to a first surface 38 of the intermediate plate 30. The second plate 50 is connected to a second surface 39 of the intermediate plate 30. The intermediate plate 30 and the first plate 40 configure the pressure sensing portion 21. The intermediate plate 30 and the second plate 50 configure the acceleration sensing portion 22 (refer to FIG. 3). Accordingly, the pressure sensing portion 21 and the acceleration sensing portion 22 share the common intermediate plate 30.

The intermediate plate 30 is a square glass plate. A disk-like first electrode 31 is attached to the first surface 38 of the intermediate plate 30. A disk-like second electrode 32 is attached to the second surface 39 of the intermediate plate 30.

A first terminal 33 and a second terminal 34 are formed on one side of the intermediate plate 30 in a manner connecting the first surface 38 and the second surface 39. A first wire 35 connecting the first terminal 33 and the first electrode 31 are formed on the first surface 38 of the intermediate plate 30. A second wire 36 connecting the second terminal 34 and the second electrode 32 are formed on the second surface 39 of the intermediate plate 30. The first and second electrodes 31 and 32, the first and second terminals 33 and 34, and the first and second wires 35 and 36 are deposited on the intermediate plate 30.

The first plate 40 is a square silicon plate and has a frustoconical cavity 41 that defines a diaphragm 42 (refer to FIG. 4) in the central portion of the first plate 40. A first bonding portion 43 having a flat surface 43a, which is bonded to the intermediate plate 30, is defined about the diaphragm 42.

A third electrode 45 is formed on the lower surface of the diaphragm 42, or on the surface facing towards the intermediate plate 30, in a manner opposed to the first electrode. A third electrode 46, which extends parallel to the first and second terminals 33 and 34, is formed on the side surface of the first plate 40. A third wire 47, which electrically connects the third terminal 46 and the third electrode 45, extends along the flat surface 43a and the wall of the cavity 41.

Etching technology and micromachining technology for semiconductor ICs are employed to form the first plate 40 with a predetermined shape. The third electrode 45, the third terminal 46, and the third wire 47 are formed by depositing conductive material, such as aluminum.

The first plate 40 and the intermediate plate 30 are aligned so that the intermediate plate 30 covers the cavity 41 of the first plate 40. In this state, the flat surface 43a of the first plate 40 and the first surface 30 of the intermediate plate 30 are anode-bonded. The bonding defines a hermetic chamber (pressure sensing chamber) 48 between the wall of the cavity 41 (diaphragm 42) and the first surface 38 of the intermediate plate 30. The first electrode 31 and the third electrode 45 are arranged in the hermetic chamber 48 (refer to FIG. 4).

Figure 5:
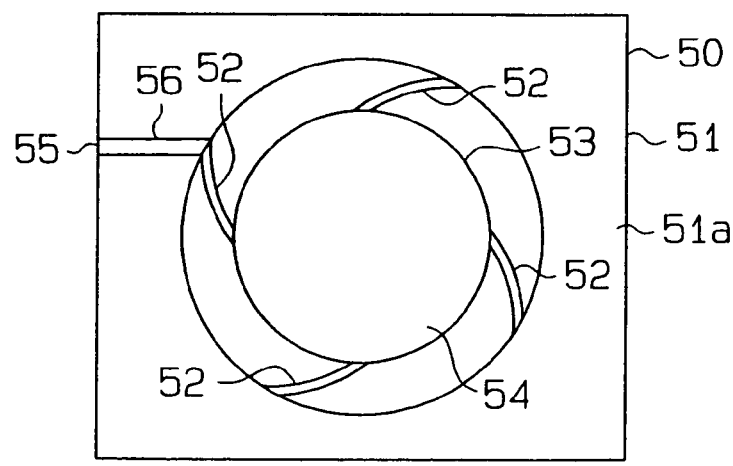
FIG. 5 is a plan view illustrating a second base.

The second plate 50 is a square silicon plate. The second plate 50 includes a frame-like second bonding portion 51, through which an opening extends, a mass 53, which is arranged in the opening, and a plurality of spring supports 52, which extend from the wall defining the opening to elastically support the mass 53. As shown in FIG. 5, it is preferred that each spring support 52 be curved.

The second bonding portion 51 includes a flat surface 51a facing towards the intermediate plate 30. The four spring supports 52 support the mass 53 so that the mass 53 is elastically movable in the direction perpendicular to the surface of the second electrode 32 but not movable in a direction parallel to the surface of the second electrode 32. This is achieved by adjusting the width and thickness of each spring support 52. For example, each spring support 52 is formed so that the spring support 52 is narrow in the direction perpendicular to the flat surface 51a and wide in the direction parallel to the flat surface 51a.

As shown in FIG. 4, the mass 53 is frustoconical and the diameter of the surface facing towards the intermediate surface (i.e., upper surface) is greater than the diameter of the surface on the opposite side of the mass 53 (i.e., lower surface). A fourth electrode 54 is arranged on the upper surface of the mass 53 in a manner facing towards the second electrode 32. As shown in FIG. 6, a fourth terminal 55, which extends parallel to the first and second terminals 33 and 34, is arranged on the side surface of the second plate 50. A fourth wire 56, which electrically connects the fourth terminal 55 and the fourth electrode 54, extends along the flat surface 51a of the second bonding portion 51 and one of the spring supports 52.

Etching technology and micromachining technology for semiconductor ICs are employed to form the second plate 50 with a predetermined shape. The fourth electrode 54, the fourth terminal 55, and the fourth wire 56 are formed by depositing conductive material, such as aluminum. The flat surface 51a of the second plate 50 and the second surface 39 of the intermediate plate 30 are anode-connected.

Figure 2:
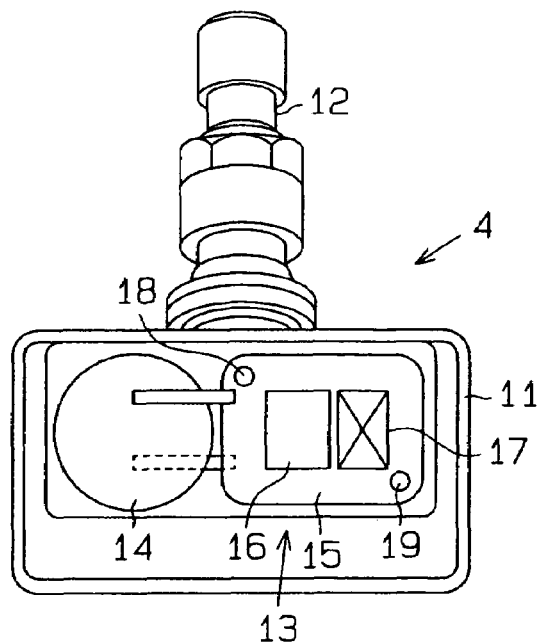
FIG. 2 is a diagram illustrating the internal structure of a transmitter.

The semiconductor sensor 16 is connected to the circuit board 15 of FIG. 2. The first, second, third, and fourth terminals 33, 34, 46, and 55 are connected to the transmitter controller 24 of FIG. 3.

The operation of the semiconductor sensor 16 and the pressure sensing portion 21 will now be discussed.

A gas having a predetermined pressure is sealed in the hermetic chamber 48. The outer surface of the first plate 40 is exposed to the air in the tire 3. Accordingly, the diaphragm 42 is deformed in accordance with the difference between the gas pressure in the hermetic chamber 48 and the air pressure in the tire 3.

The first electrode 31 of the intermediate plate 30 and the third electrode 45 of the diaphragm 42 face towards each other and form a capacitor. Deformation of the diaphragm 42 changes the distance between the first electrode 31 and the third electrode 45. The capacitance changes in accordance with the distance.

When the diaphragm 42 is not deformed, that is, when the gas pressure in the hermetic chamber 48 is the same as the air pressure in the tire 3, the distance between the first electrode 31 and the third electrode 45 is represented by d1, the dielectric constant of the gas in the hermetic chamber 48 is represented by $\epsilon 1$, and the opposing area of the first electrode 31 and the third electrode 45 is represented by S1. The capacitance C1 of the first electrode 31 and the third electrode 45 when the diaphragm 42 is not deformed is represented by equation 1.

$$C1 = \epsilon 1 \times S1 / d1 \qquad \text{[equation 1]}$$

When the air pressure in the tire 3 changes, the diaphragm 42 is deformed. This changes the distance between the first electrode 31 and the third electrode 45 from d1 to d2. The capacitance C2 of the first electrode 31 and the third electrode 45 for distance d2 is represented by equation 2.

$$C2 = \epsilon 1 \times S1 / d2 \qquad \text{[equation 2]}$$

Accordingly, measurement of the capacitance of the first electrode 31 and the third electrode 45 with the first terminal 33 and the third terminal 46 enables measurement of the distance between the electrodes 31 and 45, or the level of deformation of the diaphragm 42. As a result, the air pressure of the tire 3 is detected.

The operation of the acceleration sensing portion 22 of the semiconductor sensor 16 will now be discussed.

The spring supports 52 support the mass 53 movably in a direction perpendicular to the second electrode 32. Accordingly, when the acceleration sensing portion 22 (semiconductor sensor 16) is accelerated, the mass 53 is moved in accordance with the level of an acceleration component that is perpendicular to the second electrode 32 (hereafter, simply referred to as acceleration).

When the semiconductor sensor 16 is not accelerated (e.g., a state in which the automobile is stopped), the distance between the second electrode 32 and the fourth electrode 54 is represented by d3, the dielectric constant of the air pressure in the tire 3 is represented by $\epsilon 2$, and the opposing area of the second electrode 32 and the fourth electrode 54 is represented by S2. The capacitance C3 of the second electrode 32 and the fourth electrode 54 when the semiconductor sensor 16 is not accelerated is represented by equation 3.

$$C3 = \epsilon 3 \times S3 / d3 \qquad \text{[equation 3]}$$

When the automobile is moving, the semiconductor sensor 16 is accelerated. The mass 53 moves in an inertial manner in accordance with the level of acceleration. When the mass 53 moves and the distance d4 between the second electrode 32 and the fourth electrode 54 is represented by d4, the capacitance C4 of the second electrode 32 and the fourth electrode 54 is represented by equation 4.

$$C4 = \epsilon 2 \times S2 / d4 \qquad \text{[equation 4]}$$

The force F applied to the mass 53 by the acceleration gv is represented by equation 5.

$$F = M \times gv = K \times \Delta L \qquad \text{[equation 5]}$$

In equation 5, k represents the spring constant of the spring support 52, M represents the weight of the mass 53, and ΔL represents the distance moved by the mass 53.

The distance moved ΔL corresponds to the change in the distance between the second electrode 32 and the fourth electrode 54. Further, the distance moved ΔL is related to the difference ΔC between the capacitance C3 of the distance C3 and the capacitance C4 of the distance d4. Thus, the acceleration gv is represented by equation 6.

$$gv = k \times \epsilon 2 \times S2/(M \times \Delta C) \quad \text{[equation 6]}$$

Accordingly, the acceleration gv is monitored by measuring the capacitance Cv of the second electrode 32 and the fourth electrode 54 with the second terminal 34 and the fourth terminal 55 and by measuring changes in the capacitance Cv.

The preferred embodiment has the advantages described below.

(1) The semiconductor sensor 16 is a module on which a pressure sensing portion 21 for detecting pressure and an acceleration sensing portion 22 for detecting acceleration are formed integrally with the two surfaces 38 and 39 of the intermediate plate 30. Accordingly, the semiconductor sensor 16 is light and compact, which in turn, results in the transmitter 4 being light and compact.

(2) The intermediate plate 30 is made of glass, and the first plate 40 and the second plate 50 are made of silicon. The first plate 40 and the second plate 50 are manufactured by employing etching technology, technology relevant to etching technology, and micromachining technology for semiconductor ICs.

(3) The spring support 52 is movable in the vertical direction relative to the surface of the second electrode 32. This facilitates the detection of acceleration in a single direction.

(4) Pressure and acceleration are detected by a single semiconductor sensor. Accordingly, in comparison to a prior art transmitter having two sensors, which are the pressure sensor and the acceleration sensor, the transmitter 4 of the preferred embodiment simplifies assembly and reduces the manufacturing cost of the transmitter 4.

It should be apparent to those skilled in the art that the present invention may be embodied in many other specific forms without departing from the spirit or scope of the invention. Particularly, it should be understood that the present invention may be embodied in the following forms.

Figure 7:
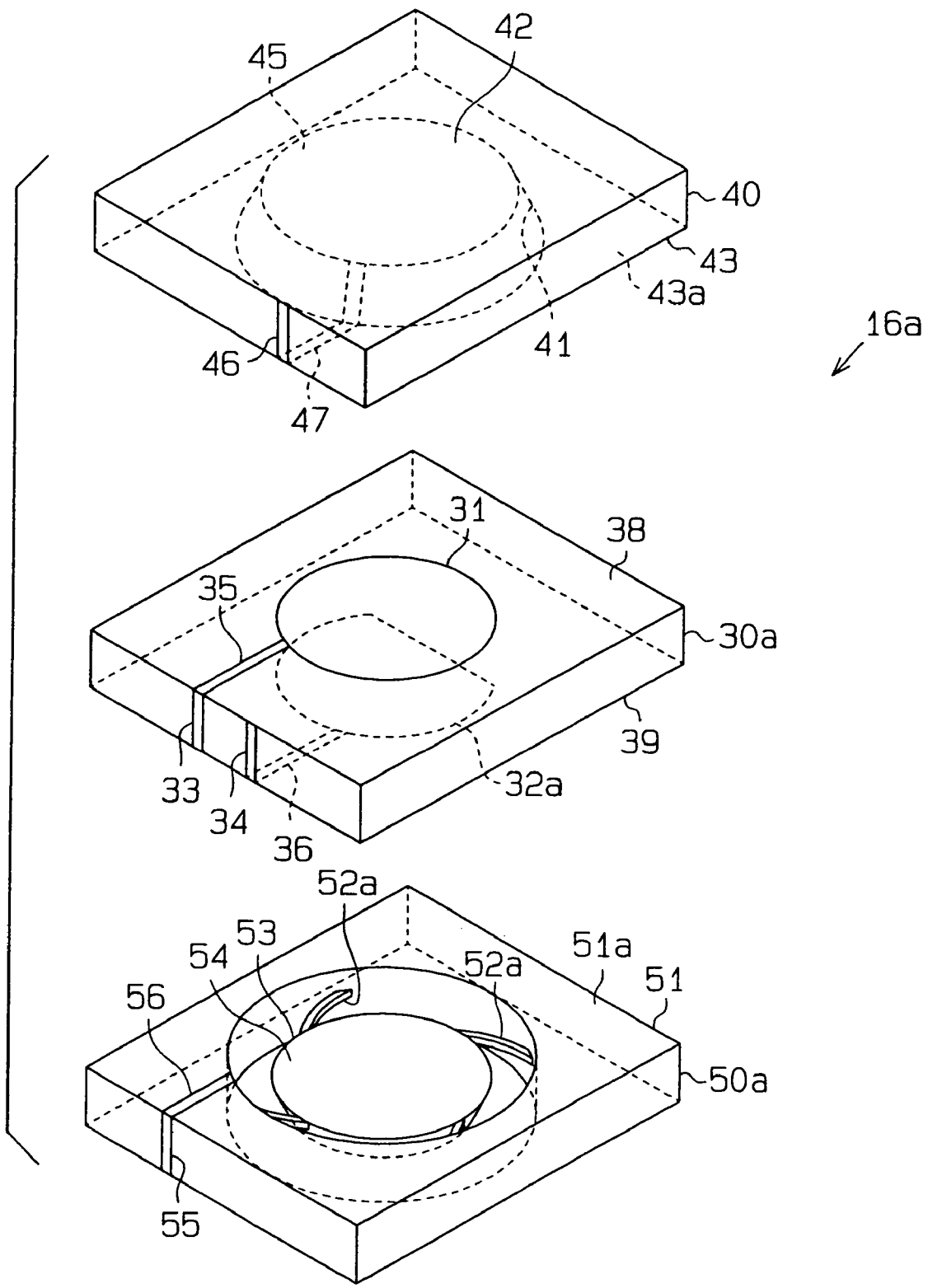
FIG. 7 is an exploded perspective view of a modification of the semiconductor sensor.

Instead of detecting acceleration acting perpendicular to the surface of the second electrode 32 (vertical component), acceleration acting parallel to the surface of the second electrode 32 (parallel component) may be detected. For example, the preferred embodiment may be modified to a semiconductor sensor 16a, which is shown in FIG. 7.

The semiconductor sensor 16a is configured by an intermediate plate 30a, a first plate 40, and a second plate 50a. A second electrode 32a, which is arranged on a second surface 39 of the intermediate plate 30a, has a cut-away portion and is D-like in shape. In the example of FIG. 7, part of the second electrode 32a is cut away so that a chord is defined opposite to a first terminal 33. Due to this shape, the area center of the second electrode 32a and the area center of a fourth electrode 54 of the second plate 50a are offset from each other.

Spring supports 52a of a second plate 50a support the mass 53 in a manner elastically movable in a direction parallel to the second electrode 32a but unmovable in a direction perpendicular to the second electrode 32a. Each spring support 52a is formed so that the spring support 52a is wide in the direction perpendicular to the flat surface 51a and narrow in the direction parallel to the flat surface 51a.

Acceleration moves the mass 53 in a direction intersecting the chord of the second electrode 32a and varies the opposing area of the second electrode 32a and the fourth electrode 54. The varied amount corresponds to the moving direction of the mass 53. In the example of FIG. 7 in which part of the second electrode 32a is cut away so as to form a chord in a direction opposite to the surface having the first terminal 33, when the mass 53 moves toward the first terminal 33, the opposed area of the second electrode 32a and the fourth electrode 54 increases. On the other hand, when the mass 53 moves away from the first terminal 33, the opposed area decreases.

The change in the opposed area is related to the distance moved by the mass 53, or the level of acceleration. Further, the capacitance of the second electrode 32a and the fourth electrode 54 is proportional to the opposed area. Accordingly, measurement of the capacitance of the two electrodes 32a and 54 enables detection of the distance moved by the mass 53, or the acceleration applied to the semiconductor sensor.

In the preferred embodiment, the intermediate plate 30a of FIG. 7 may be used in lieu of the intermediate plate 30. More specifically, the intermediate plate 30a and the second plate 50 are bonded to obtain a semiconductor sensor that detects acceleration in a direction perpendicular to the second electrode 32a. Further, the intermediate plate 30a and the second plate 50a of FIG. 7 are bonded to each other to obtain a semiconductor sensor for detecting acceleration in a direction parallel to the second electrode 32a.

The shapes of the electrodes 31, 32, 32a, 45, and 54, the cavity 41, and the mass 53 may be changed as required.

The semiconductor sensors 16 and 16a may be applied to an apparatus other than one that monitors a tire condition.

In the preferred embodiment, acceleration is detected. However, it is only necessary for the transmitter 4 incorporating the semiconductor sensor 16 or 16a to determine whether or not the vehicle 2 is moving. For example, the transmitter controller 24 may store the capacitance of the second electrode 32 or 32a and the fourth electrode 54 when the vehicle 2 is not moving and compare the stored capacitance with the present capacitance. If the two capacitances are the same or the difference between the two capacitances is less than a predetermined value, it is determined that the vehicle 2 is not moving. If the two capacitances are not the same or the difference between the two capacitances is greater than or equal to the predetermined value, it is determined that the vehicle 2 is moving.

The present examples and embodiments are to be considered as illustrative and not restrictive, and the invention is not to be limited to the details given herein, but may be modified within the scope and equivalence of the appended claims.

What is claimed is:

1. A semiconductor sensor comprising:
    an intermediate plate having a first surface and a second surface;
    a first electrode arranged on the first surface;
    a second electrode arranged on the second surface;
    a first plate having a cavity for forming a diaphragm and being bonded to the first surface, wherein the first plate, the intermediate plate, and the cavity define a hermetic chamber;
    a third electrode arranged in the cavity facing towards the first electrode, wherein the third electrode and the first electrode are arranged in the hermetic chamber; and
    a second plate bonded to the second surface and having a mass, the second plate including an elastic support for elastically supporting the mass and a fourth electrode arranged on the mass facing towards the second electrode.

2. The semiconductor sensor according to claim 1, wherein the intermediate plate is made of glass, and the first and second plates are made of silicon.

3. The semiconductor sensor according to claim 1, wherein the elastic support supports the mass movably in a direction perpendicular to the second surface when the semiconductor sensor is accelerated.

4. The semiconductor sensor according to claim 1, wherein the elastic support movably supports the mass parallel to the second surface when the semiconductor sensor is accelerated.

5. The semiconductor sensor according to claim 1, wherein the fourth electrode has a center offset from a center of the second electrode along the second surface, and the elastic support movably supports the mass along a line extending through the center of the second electrode and the center of the fourth electrode.

6. The semiconductor sensor according to claim 1, wherein the second plate has a cavity, and the mass is arranged in the cavity.

7. The semiconductor sensor according to claim 1, wherein the semiconductor sensor is arranged in a transmitter fixed to a tire of a vehicle in an apparatus for monitoring the condition of the tire.

8. A transmitter for use in an apparatus for monitoring a condition of a tire on a vehicle, the transmitter comprising:
a semiconductor sensor for detecting acceleration and air pressure of the tire, the semiconductor sensor including:
an intermediate plate having a first surface and a second surface;
a first electrode arranged on the first surface;
a second electrode arranged on the second surface;
a first plate having a cavity for forming a diaphragm and being bonded to the first surface, wherein the first plate, the intermediate plate, and the cavity define a hermetic chamber;
a third electrode arranged in the cavity and facing towards the first electrode, wherein the third electrode and the first electrode are arranged in the hermetic chamber; and
a second plate bonded to the second surface and having a mass, the second plate including an elastic support for elastically supporting the mass and a fourth electrode arranged on the mass facing towards the second electrode; and
a controller connected to the semiconductor sensor to determine whether the vehicle is moving based on the detected acceleration, wherein the controller transmits information of the detected tire air pressure when the vehicle is moving.

9. The transmitter according to claim 8, wherein the intermediate plate is made of glass, and the first and second plates are made of silicon.

10. The transmitter according to claim 8, wherein the elastic support supports the mass movably in a direction perpendicular to the second surface when the semiconductor sensor is accelerated.

11. The transmitter according to claim 8, wherein the elastic support movably supports the mass parallel to the second surface when the semiconductor sensor is accelerated.

12. The transmitter according to claim 8, wherein the fourth electrode has a center offset from a center of the second electrode along the second surface, and the elastic support movably supports the mass along a line extending through the center of the second electrode and the center of the fourth electrode.

13. A semiconductor sensor comprising:
an intermediate plate having a first surface and a second surface;
a pressure sensing portion defined on the first surface, the pressure sensing portion including:
a first electrode arranged on the first surface;
a first plate bonded to the first surface, the first plate having a cavity for forming a diaphragm, wherein the first plate, the intermediate plate, and the cavity define a hermetic chamber; and
a third electrode arranged in the cavity facing towards the first electrode, wherein the third electrode and the first electrode are arranged in the hermetic chamber; and
an acceleration sensing portion defined on the second surface, the acceleration sensing portion including:
a second electrode arranged on the second surface;
a second plate bonded to the second surface and having a mass;
an elastic support for elastically connecting the second plate and the mass; and
a fourth electrode arranged on the mass facing towards the second electrode.

14. A transmitter for use in an apparatus for monitoring the condition of a tire of a vehicle, the transmitter comprising:
a semiconductor sensor including a pressure sensing portion for detecting air pressure of the tire and an acceleration sensing portion for detecting acceleration, the pressure sensing portion and the acceleration sensing portion being formed integrally with each other, wherein the semiconductor sensor further includes an intermediate plate having a first surface on which the pressure sensing portion is arranged and a second surface on which the acceleration sensing portion is arranged, the pressure sensing portion including a first electrode arranged on the first surface, a first plate bonded to the first surface, the first plate having a cavity for forming a diaphragm, wherein the first plate, the intermediate plate, and the cavity define a hermetic chamber, and a third electrode arranged on the diaphragm facing towards the first electrode, wherein the third electrode and the first electrode are arranged in the hermetic chamber and wherein the acceleration sensing portion further includes a second electrode arranged on the second surface, a second plate bonded to the second surface, a mass movable relative to the second electrode when the semiconductor sensor is accelerated, a plurality of elastic supports for elastically connecting the second plate and the mass, and a fourth electrode arranged on the mass facing towards the second electrode; and
a controller connected to the semiconductor sensor for determining whether or not the vehicle is moving from the detected acceleration, wherein the controller transmits information of the detected tire air pressure when the vehicle is moving.

15. The transmitter according to claim 14, wherein each of the elastic supports is curved.

16. The transmitter according to claim 15, wherein the plurality of elastic supports extend radially from the mass.

17. The transmitter according to claim 14, wherein the pressure sensing portion and the acceleration sensing portion share the intermediate plate.

* * * * *